United States Patent
Wang

(10) Patent No.: US 12,328,503 B2
(45) Date of Patent: Jun. 10, 2025

(54) METHOD AND APPARATUS FOR FOCUSING OF IMAGE SENSOR AND ELECTRONIC DEVICE

(71) Applicant: VIVO MOBILE COMMUNICATION CO., LTD., Guangdong (CN)

(72) Inventor: Danmei Wang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 91 days.

(21) Appl. No.: 18/354,365

(22) Filed: Jul. 18, 2023

(65) Prior Publication Data

US 2023/0362486 A1 Nov. 9, 2023

Related U.S. Application Data

(63) Continuation of application No. PCT/CN2022/071978, filed on Jan. 14, 2022.

(30) Foreign Application Priority Data

Jan. 21, 2021 (CN) .......................... 202110081275.2

(51) Int. Cl.
*H04N 23/67* (2023.01)
(52) U.S. Cl.
CPC ................................ *H04N 23/672* (2023.01)
(58) Field of Classification Search
CPC .... H04N 23/672; H04N 25/704; H04N 23/55; H04N 23/67; H04N 23/54
See application file for complete search history.

(56) References Cited

U.S. PATENT DOCUMENTS

| 9,344,620 | B2 | 5/2016 | Izawa |
| 2012/0293706 | A1 | 11/2012 | Usui |
| 2013/0155271 | A1 | 6/2013 | Ishii |
| 2015/0156405 | A1* | 6/2015 | Izawa ................. H04N 25/704 348/222.1 |

(Continued)

FOREIGN PATENT DOCUMENTS

| CN | 107211095 A | 9/2017 |
| CN | 109905600 A | 6/2019 |

(Continued)

OTHER PUBLICATIONS

First Office Action for Chinese Application No. 202110081275.2, dated Mar. 18, 2022, 7 Pages.

(Continued)

*Primary Examiner* — Gevell V Selby
(74) *Attorney, Agent, or Firm* — BROOKS KUSHMAN P.C.

(57) ABSTRACT

A method and apparatus for focusing and an electronic device. The method includes: obtaining phase information detected respectively by at least four groups of phase detection pixels that an image sensor includes, where the at least four groups of phase detection pixels are arranged in different directions relative to a target pixel on the image sensor; determining phase difference information in at least two directions based on the phase information of the at least four groups of phase detection pixels; and focusing, based on the phase difference information in the at least two directions, a camera module to which the image sensor belongs.

18 Claims, 4 Drawing Sheets

(56) References Cited

U.S. PATENT DOCUMENTS

| | | |
|---|---|---|
| 2015/0319420 A1 | 11/2015 | Fettig et al. |
| 2016/0269619 A1* | 9/2016 | Ui .................. H04N 25/702 |
| 2016/0286108 A1 | 9/2016 | Fettig et al. |
| 2017/0257587 A1* | 9/2017 | Hatano ............. H04N 25/778 |
| 2017/0301718 A1* | 10/2017 | Chou ............... H04N 25/778 |
| 2019/0012797 A1 | 1/2019 | Wan et al. |
| 2019/0206086 A1 | 7/2019 | Du et al. |
| 2019/0281226 A1 | 9/2019 | Wang et al. |

FOREIGN PATENT DOCUMENTS

| | | |
|---|---|---|
| CN | 109982070 A | 7/2019 |
| CN | 110246853 A | 9/2019 |
| CN | 111787237 A | 10/2020 |
| CN | 112929563 A | 6/2021 |

OTHER PUBLICATIONS

International Search Report and Written Opinion for Application No. PCT /CN2022/071978, dated Mar. 24, 2022, 9 Pages.
Extended European Search Report for Application No. 22742084.1, dated Jun. 12, 2024, 9 Pages.

* cited by examiner

METHOD AND APPARATUS FOR FOCUSING OF IMAGE SENSOR AND ELECTRONIC DEVICE

CROSS-REFERENCE TO RELATED APPLICATIONS

This application is a continuation of PCT International Application No. PCT/CN2022/071978 filed on Jan. 14, 2022, which claims priority to Chinese Patent Application No. 202110081275.2 filed on Jan. 21, 2021, which are incorporated herein by reference in their entireties.

TECHNICAL FIELD

This application belongs to the field of communication technologies, and specifically, relates to a method and apparatus for focusing and an electronic device.

BACKGROUND

Currently, the competition in the electronic device market is becoming fierce, especially in the field of photographing through cameras. The competition is mainly manifested in the following aspects:
 a camera module lens design, such as wide angle, telephoto, and conventional photographing;
 a camera module driving system, such as automatic focusing (AF) and optical image stabilization (OIS) focusing; and
 a camera module image sensor, such as a high pixel, an improvement in a night scene photographing effect, a high frame slow motion, a video, and an improvement in focusing performance.

A current image sensor adopts a phase detection focusing design.

The design of a phase detection system can obtain only phase information in a horizontal direction. After electrical signals are obtained through two phase detection pixels: a left pixel (L for short) and a right pixel (R for short), phase difference information is further calculated based on values of the electrical signals. Then, an offset distance of an image is calculated by using the phase difference information. Based on the offset distance, a distance by which a lens in a camera module to which the image sensor belongs needs to be moved may be determined. Finally, a focusing function is realized.

However, since the design of the phase detection system has only the phase detection pixels L and R, only a left-right phase difference can be outputted, and therefore only phase information in the horizontal direction can be outputted. However, when horizontal stripes exist in a to-be-photographed scene, the information outputted by the phase detection pixels L and R on a chip end is equal, and therefore the phase detection function cannot be realized.

In conclusion, since to-be-photographed scenes with horizontal or vertical stripes are inevitable during actual photographing, the phase detection system of the current image sensor cannot realize its functions, which affects user experience of consumers in focusing.

SUMMARY

According to a first aspect, an embodiment of this application provides a method for focusing. The method includes:
 obtaining phase information detected respectively by at least four groups of phase detection pixels that an image sensor includes, where the at least four groups of phase detection pixels are arranged at different angles relative to a target pixel on the image sensor;
 determining phase difference information in at least two directions based on the phase information of the at least four groups of phase detection pixels; and
 focusing, based on the phase difference information in the at least two directions, a camera module to which the image sensor belongs.

According to a second aspect, an embodiment of this application provides an apparatus for focusing. The apparatus includes:
 an acquisition module, configured to obtain phase information detected respectively by at least four groups of phase detection pixels that an image sensor includes, where the at least four groups of phase detection pixels are arranged at different angles relative to a target pixel on the image sensor;
 a determining module, configured to determine phase difference information in at least two directions based on the phase information of the at least four groups of phase detection pixels; and a focusing module, configured to focus, based on the phase difference information in the at least two directions, a camera module to which the image sensor belongs.

According to a third aspect, an embodiment of this application provides an electronic device. The electronic device includes a processor, a memory, and a program or instructions stored in the memory and executable on the processor, and when the program or the instructions are executed by the processor, the steps of the method in the first aspect are implemented.

According to a fourth aspect, an embodiment of this application provides a readable storage medium storing a program or instructions, and when the program or the instructions are executed by a processor, the steps of the method in the first aspect are implemented.

According to a fifth aspect, an embodiment of this application provides a chip. The chip includes a processor and a communication interface, the communication interface is coupled to the processor, and the processor is configured to execute a program or instructions to implement the method in the first aspect.

According to a sixth aspect, an embodiment of this application provides a computer program product stored in a storage medium, and the computer program product is executed by at least one processor to implement the steps of the method in the first aspect.

DETAILED DESCRIPTION

The technical solutions in the embodiments of this application are clearly described below with reference to the drawings in the embodiments of this application. Apparently, the described embodiments are merely some of the embodiments of this application rather than all of the embodiments. All other embodiments obtained by a person of ordinary skill in the art based on the embodiments of this application without creative efforts shall fall within the protection scope of this application.

The terms "first", "second", and the like in the description and claims of this application are used to distinguish between similar objects, rather than describe a specific sequence or order. It should be understood that the terms used in this case may be transposed where appropriate, so that the embodiments of this application may be implemented in a sequence other than those illustrated or described herein. In addition, objects indicated by "first", "second", and the like are usually of the same class and do not limit the number of objects. For example, there may be one or more first objects. In addition, "and/or" in the description and claims indicates at least one of the connected objects, and the character "/" generally indicates that the associated objects at front and rear are in an "or" relationship.

A method and apparatus for focusing and an electronic device provided in the embodiments of this application are described below in detail through specific embodiments and application scenarios with reference to the drawings.

Figure 1:
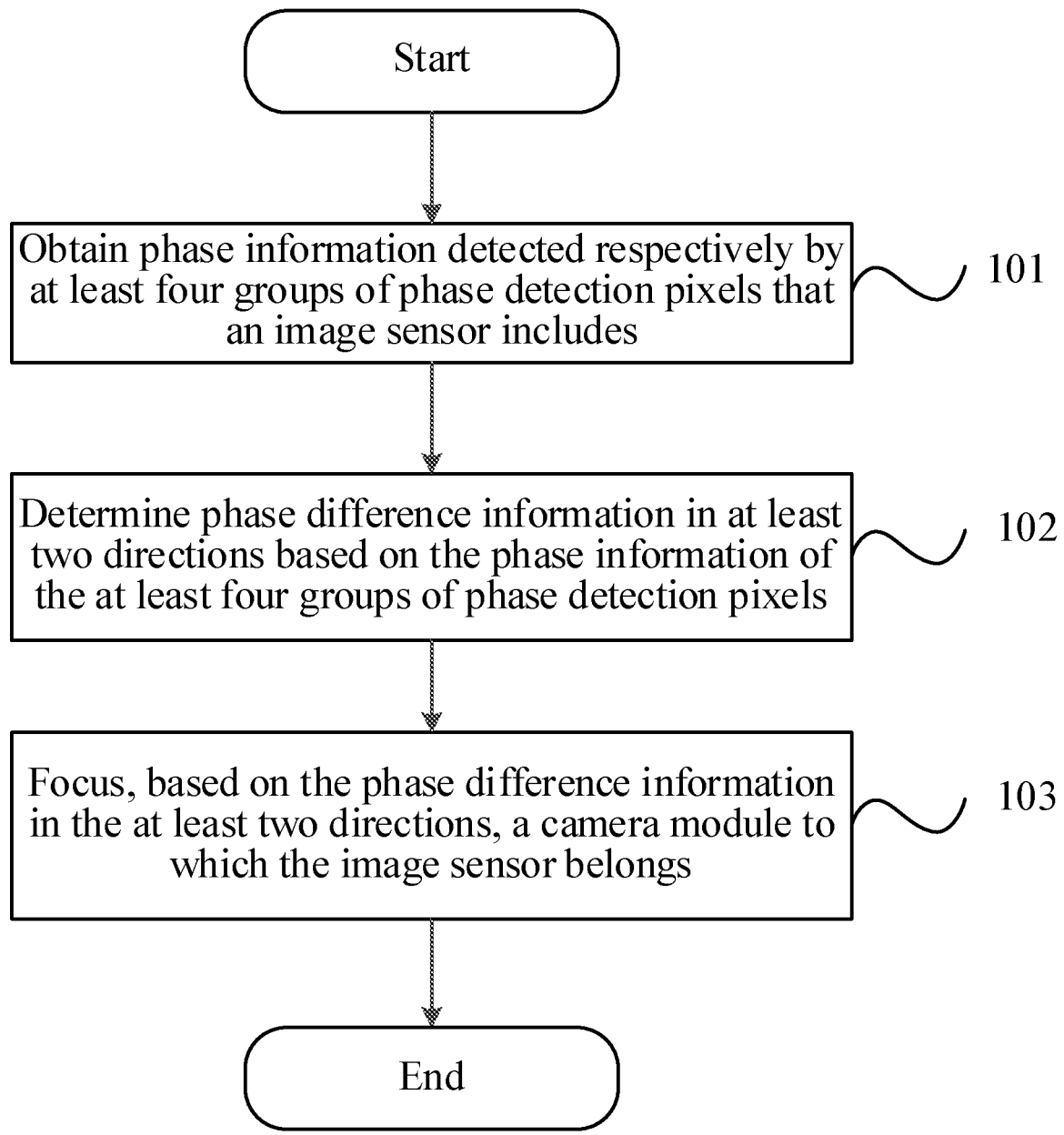
FIG. 1 is a step flowchart of a method for focusing according to an embodiment of this application.

As shown in FIG. 1, an embodiment of this application provides a method for focusing. The method includes the following steps:

Step 101: Obtain phase information detected respectively by at least four groups of phase detection pixels that an image sensor includes. The at least four groups of phase detection pixels are arranged at different angles relative to a target pixel on the image sensor.

Step 102: Determine phase difference information in at least two directions based on the phase information of the at least four groups of phase detection pixels.

The phase difference information in each direction needs to be determined based on the phase information of at least two groups of phase detection pixels.

Step 103: Focus, based on the phase difference information in the at least two directions, a camera module to which the image sensor belongs.

Optionally, the image sensor provided in this embodiment of this application includes: a pixel array; and at least four groups of phase detection pixels selected from the pixel array, where the at least four groups of phase detection pixels are arranged at different angles relative to a target pixel on the image sensor, and it should be noted that the target pixel is a reference pixel, which is a pixel with a fixed position; and a phase output signal line, connected to each group of phase detection pixels, where the phase output signal line is configured to output phase information of each group of phase detection pixels.

In an optional embodiment, the focusing, based on the determined phase difference information in the at least two directions, a camera module to which the image sensor belongs includes:

calculating an offset distance in each of the directions based on the phase difference information in each of the directions;

calculating a comprehensive offset distance of an image based on the offset distance in each of the directions; and determining, based on the offset distance, a distance by which a lens in a camera module to which the image sensor belongs needs to be moved to achieve the focusing.

It should be noted that the at least four groups of phase detection pixels in this embodiment of this application include four groups of phase detection pixels, six groups of phase detection pixels, eight groups of phase detection pixels, ten groups of phase detection pixels, or the like, which are not enumerated herein. In a specific embodiment, a number of phase detection pixels depends on an actual hardware configuration of the image sensor, which is not specifically limited herein.

Figure 2:
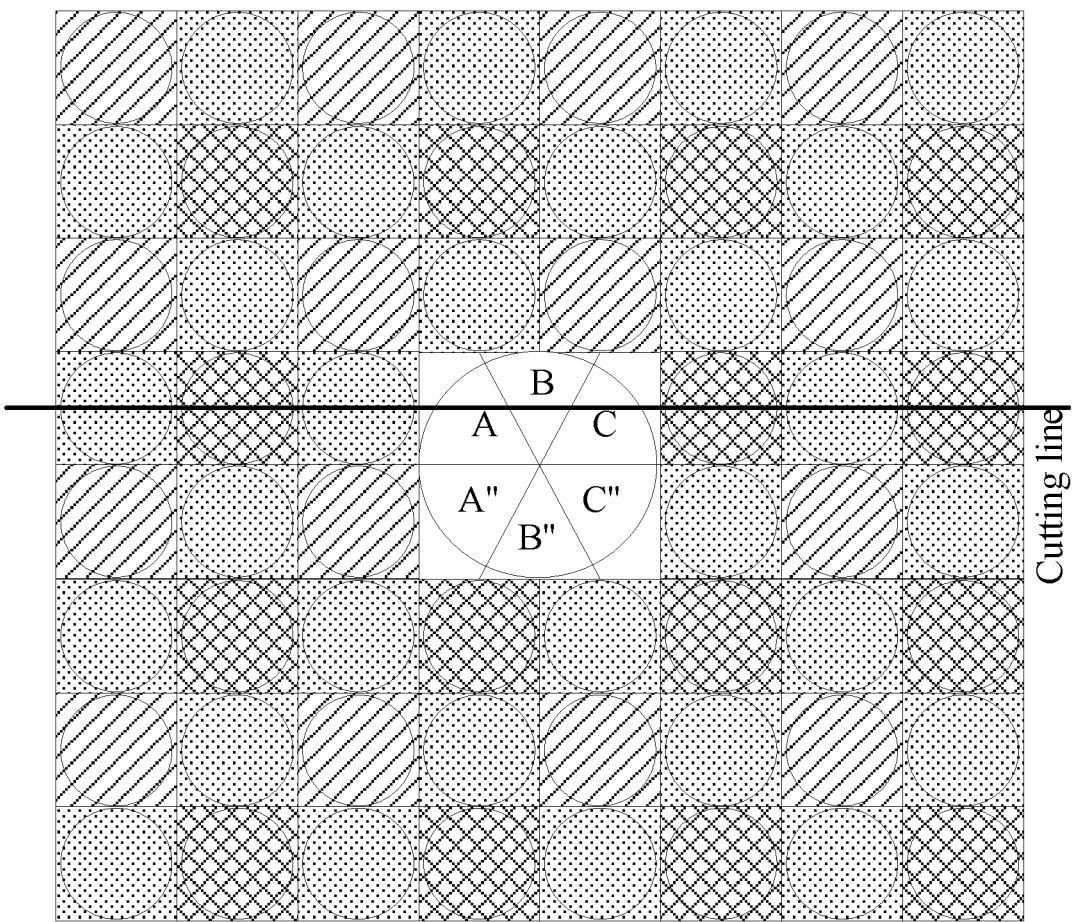
FIG. 2 is a first schematic diagram of a pixel array of an image sensor in the method for focusing according to an embodiment of this application.
Figure 3:
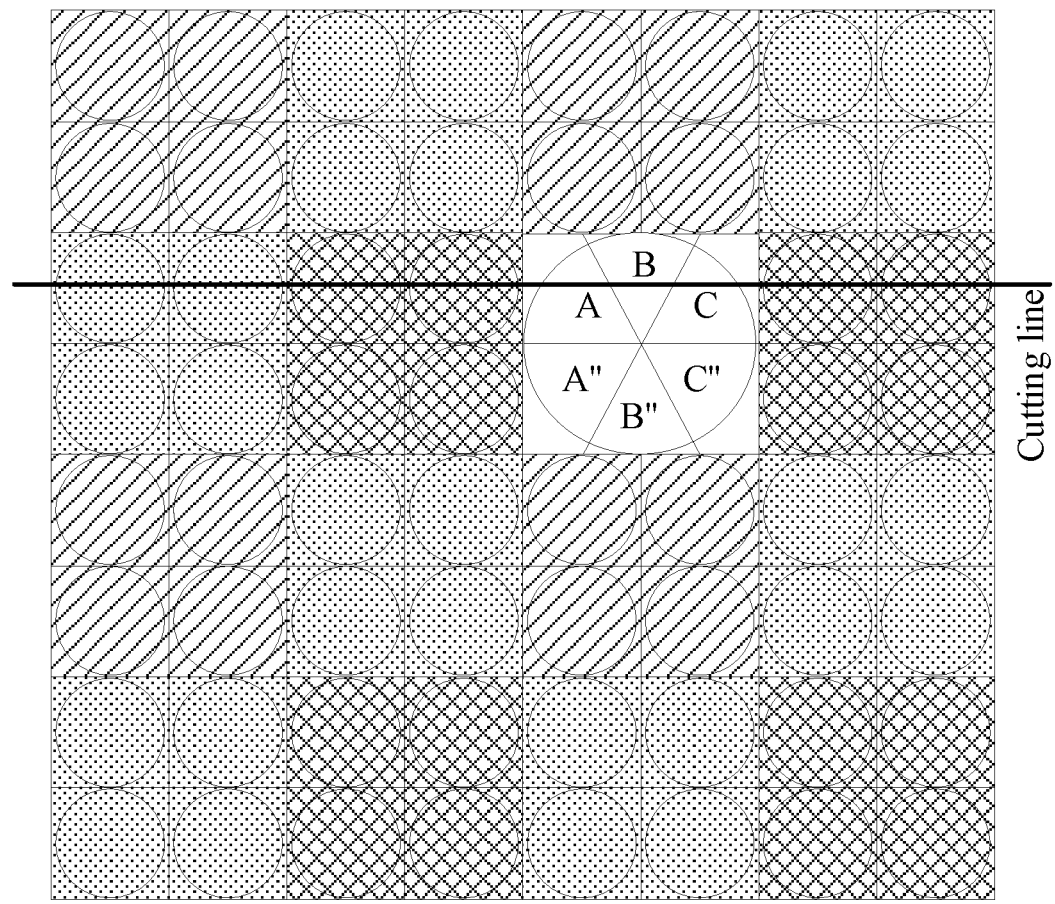
FIG. 3 is a second schematic diagram of a pixel array of an image sensor in the method for focusing according to an embodiment of this application.

In an optional embodiment, as shown in FIG. 2 or FIG. 3, the at least four groups of phase detection pixels include six groups of phase detection pixels. For example, if the six groups of phase detection pixels form a circle, a point of intersection of the six groups of phase detection pixels, that is, a center of the circle, is a target pixel. Correspondingly, angles between the six groups of phase detection pixels and the target pixel include:

a first angle, where the first angle is in a range of 0° to +60°, and the group of phase detection pixels at the first angle may also be referred to as a top right pixel (C for short);

a second angle, where the second angle is in a range of +60° to +120°, and the group of phase detection pixels at the second angle may also be referred to as a top middle pixel (B for short);

a third angle, where the third angle is in a range of +120° to +180°, and the group of phase detection pixels at the third angle may also be referred to as a top left pixel (A for short);

a fourth angle, where the fourth angle is in a range of −60° to 0°, and the group of phase detection pixels at the fourth angle may also be referred to as a bottom right pixel (C" for short);

a fifth angle, where the fifth angle is in a range of −120° to −60°, and the group of phase detection pixels at the fifth angle may also be referred to as a bottom middle pixel (B" for short); and a sixth angle, where the sixth angle is in a range of −180° to −120°, and the group of phase detection pixels at the sixth angle may also be referred to as a bottom left pixel (A" for short).

Optionally, FIG. 2 is a schematic diagram of a pixel array of a Bayer image sensor, and FIG. 3 is a schematic diagram of a pixel array of a four-in-one image sensor.

In an optional embodiment, the image sensor further includes a plurality of photodiodes (PD), at least one color filter (CF), and at least one micro lens (ML).

A transmission and a wavelength of the color filter in this embodiment of this application are not limited, and the color filter may be applied to an optical wavelength in any wavelength band. A type of the color filter is not limited in this embodiment of this application. An arrangement mode of the color filter of the image sensor is not limited in this embodiment of this application. For example, four in one, nine in one, and sixteen in one are all applicable to this application.

Optionally, a type of the micro lens in the image sensor is not limited in this embodiment of this application. For example, one PD corresponds to one ML, two PDs correspond to one ML, or three PDs correspond to one ML. These are all applicable to this application.

Optionally, an arrangement density on the image sensor is not limited in this embodiment of this application. For example, 1/32, 1/48, 1/64, . . . , 1/(4*4*n) are all applicable, where n is an integer greater than or equal to 2.

Optionally, a pixel unit size applicable to the phase detection pixel is not limited in this embodiment of this application, and may be any size. Alternatively, a pixel array size applicable to the phase detection pixel is not limited in this embodiment of this application, which can be any n*m pixel array.

Optionally, an image sensor type is not limited in this embodiment of this application. For example, the image sensor may be an image sensor based on a complementary metal oxide semiconductor (CMOS), an image sensor based on a charge coupled device (CCD) based image sensors, an image sensor based on a quantum thin film, or an image sensor based on an organic photoconductive film.

In an optional embodiment, step 102 includes:
  determining phase difference information in a target direction based on the phase information of at least two groups of phase detection pixels.

The determining phase difference information in a target direction based on the phase information of at least two groups of phase detection pixels includes:
  determining a first phase sum of the phase information of the phase detection pixel at the third angle and the phase information of the phase detection pixel at the sixth angle;
  determining a second phase sum of the phase information of the phase detection pixel at the first angle and the phase information of the phase detection pixel at the fourth angle; and
  determining phase difference information in a horizontal direction based on a phase difference between the first phase sum and the second phase sum.

Alternatively, the determining phase difference information in a target direction based on the phase information of at least two groups of phase detection pixels includes:
  determining a third phase sum of the phase information of the phase detection pixel at the first angle, the phase information of the phase detection pixel at the second angle, and the phase information of the phase detection pixel at the third angle;
  determining a fourth phase sum of the phase information of the phase detection pixel at the fourth angle, the phase information of the phase detection pixel at the fifth angle, and the phase information of the phase detection pixel at the sixth angle; and
  determining phase difference information in a vertical direction based on a phase difference between the third phase sum and the fourth phase sum.

Alternatively, the determining phase difference information in a target direction based on the phase information of at least two groups of phase detection pixels includes:
  determining phase difference information in a +45° direction based on a phase difference between the phase information of the phase detection pixel at the first angle and the phase information of the phase detection pixel at the sixth angle.

Alternatively, the determining phase difference information in a target direction based on the phase information of at least two groups of phase detection pixels includes:

determining phase difference information in a −45° direction based on a phase difference between the phase information of the phase detection pixel at the third angle and the phase information of the phase detection pixel at the fourth angle.

Alternatively, the determining phase difference information in a target direction based on the phase information of at least two groups of phase detection pixels includes:
  determining a fifth phase sum of the phase information of the phase detection pixel at the first angle and the phase information of the phase detection pixel at the second angle; determining a sixth phase sum of the phase information of the phase detection pixel at the fifth angle and the phase information of the phase detection pixel at the sixth angle; and
  determining phase difference information in a +15° direction based on a phase difference between the fifth phase sum and the sixth phase sum.

Alternatively, the determining phase difference information in a target direction based on the phase information of at least two groups of phase detection pixels includes:
  determining a seventh phase sum of the phase information of the phase detection pixel at the second angle and the phase information of the phase detection pixel at the third angle; determining an eighth phase sum of the phase information of the phase detection pixel at the fourth angle and the phase information of the phase detection pixel at the fifth angle; and
  determining phase difference information in a −15° direction based on a phase difference between the seventh phase sum and the eighth phase sum.

Based on the above, a calculation manner of the phase difference information in the at least two directions that may be obtained through the method for focusing provided in this embodiment of this application is shown in Table 1.

TABLE 1

| Directions for which phase difference information may be obtained | Calculation manner |
| --- | --- |
| Horizontal | Phase information in the horizontal direction is obtained through subtraction of the phase information of the phase detection pixels A&A" and C&C"; |
| Vertical | Phase information in the vertical direction is obtained through subtraction of the phase information of the phase detection pixels A&B&C and A"&B"&C"; |
| +45° | phase information in the +45° direction is obtained through subtraction of the phase information of the phase detection pixels C and A"; |
| −45° | Phase information in the −45° direction is obtained through subtraction of the phase information of the phase detection pixels A and C"; |
| +15° | phase information in the +15° direction is obtained through subtraction of the phase information of the phase detection pixels B&C and A"&B"; |
| −15° | Phase information in the −15° direction is obtained through subtraction of the phase information of the phase detection pixels A&B and B"&C". |

It may be learned from the above that through the method for focusing provided in this embodiment of this application, phase difference information in more directions may be obtained, thereby improving the experience of a focusing system of the camera module.

Optionally, since phase information in more directions may be obtained through the method for focusing provided in this embodiment of this application, a larger amount of data processing may be required during actual photographing. Therefore, in order to avoid a long image generation time caused by the impact of a large amount of data calculation, in actual application, based on a selected to-be-photographed scene, a backend platform may control image signal processing through information about the to-be-photographed scene obtained through a photographing preview interface, and selectively obtain data of a required direction, and then perform data processing. In this way, precise focusing is quickly realized.

In the embodiments of this application, the design of the phase detection pixels in the pixel array of the image sensor is improved, so that the image sensor can output the phase difference information in the at least two directions. In this way, a phase detection system of the image sensor may be applied to more to-be-photographed scenes, which resolves a problem regarding focusing experience in a camera system for a user, thereby improving focusing experience.

It should be noted that the method for focusing provided in this embodiment of this application may be executed by an apparatus for focusing, or by a control module in the apparatus for focusing for loading and performing the method for focusing. In this embodiment of this application, the apparatus for focusing performing the method for focusing is used as an example to describe the apparatus for focusing provided in the embodiments of this application.

Figure 4:
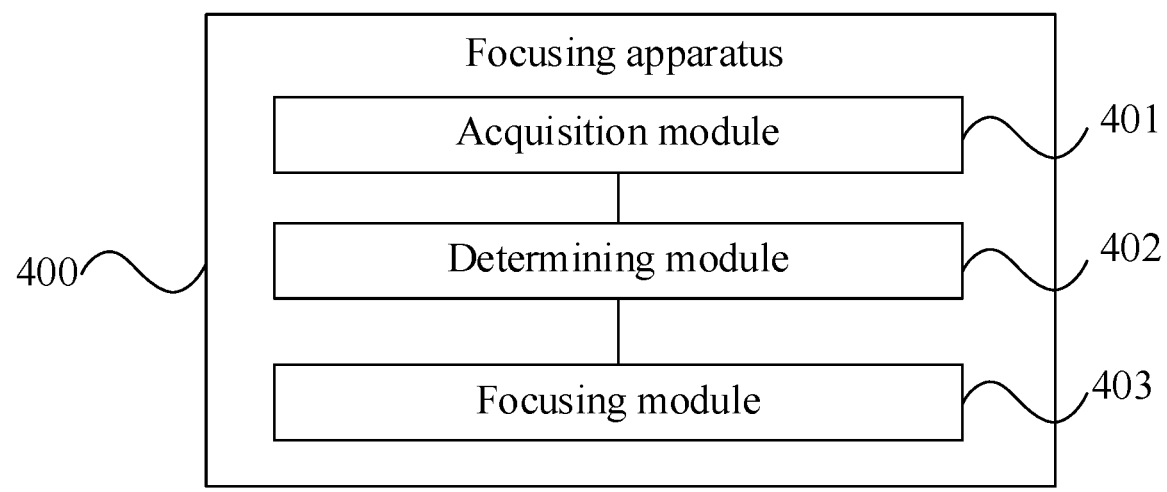
FIG. 4 is a schematic structural diagram of an apparatus for focusing according to an embodiment of this application.

As shown in FIG. 4, an embodiment of this application provides an apparatus for focusing 400, including:
- an acquisition module 401, configured to obtain phase information detected respectively by at least four groups of phase detection pixels that an image sensor includes, where the at least four groups of phase detection pixels are arranged at different angles relative to a target pixel on the image sensor;
- a determining module 402, configured to determine phase difference information in at least two directions based on the phase information of the at least four groups of phase detection pixels; and a focusing module 403, configured to focus, based on the phase difference information in the at least two directions, a camera module to which the image sensor belongs.

In an optional embodiment, the at least four groups of phase detection pixels include six groups of phase detection pixels, and angles between the six groups of phase detection pixels and the target pixel include:
- a first angle, where the first angle is in a range of 0° to +60°; and
- a second angle, where the second angle is in a range of +60° to +120°; and
- a third angle, where the third angle is in a range of +120° to +180°; and
- a fourth angle, where the fourth angle is in a range of −60° to 0°; and
- a fifth angle, where the fifth angle is in a range of −120° to −60°; and
- a sixth angle, where the sixth angle is in a range of −180° to −120°.

In an optional embodiment, the determining module includes:
- a first unit, configured to determine a first phase sum of the phase information of the phase detection pixel at the third angle and the phase information of the phase detection pixel at the sixth angle;
- a second unit, configured to determine a second phase sum of the phase information of the phase detection pixel at the first angle and the phase information of the phase detection pixel at the fourth angle; and
- a third unit, configured to determine phase difference information in a horizontal direction based on a phase difference between the first phase sum and the second phase sum.

In an optional embodiment, the determining module includes:
- a fourth unit, configured to determine a third phase sum of the phase information of the phase detection pixel at the first angle, the phase information of the phase detection pixel at the second angle, and the phase information of the phase detection pixel at the third angle;
- a fifth unit, configured to determine a fourth phase sum of the phase information of the phase detection pixel at the fourth angle, the phase information of the phase detection pixel at the fifth angle, and the phase information of the phase detection pixel at the sixth angle; and
- a sixth unit, configured to determine phase difference information in a vertical direction based on a phase difference between the third phase sum and the fourth phase sum.

In an optional embodiment, the determining module includes:
- a seventh unit, configured to determine phase difference information in a +45° direction based on a phase difference between the phase information of the phase detection pixel at the first angle and the phase information of the phase detection pixel at the sixth angle.

In an optional embodiment, the determining module includes:
- an eighth unit, configured to determine phase difference information in a −45° direction based on a phase difference between the phase information of the phase detection pixel at the third angle and the phase information of the phase detection pixel at the fourth angle.

In an optional embodiment, the determining module includes:
- a ninth unit, configured to determine a fifth phase sum of the phase information of the phase detection pixel at the first angle and the phase information of the phase detection pixel at the second angle;
- a tenth unit, configured to determine a sixth phase sum of the phase information of the phase detection pixel at the fifth angle and the phase information of the phase detection pixel at the sixth angle; and
- an eleventh unit, configured to determine phase difference information in a +15° direction based on a phase difference between the fifth phase sum and the sixth phase sum.

In an optional embodiment, the determining module includes:
- a twelfth unit, configured to determine a seventh phase sum of the phase information of the phase detection pixel at the second angle and the phase information of the phase detection pixel at the third angle;
- a thirteenth unit, configured to determine an eighth phase sum of the phase information of the phase detection pixel at the fourth angle and the phase information of the phase detection pixel at the fifth angle; and a fourteenth unit, configured to determine phase difference information in a −15° direction based on a phase difference between the seventh phase sum and the eighth phase sum.

In the embodiments of this application, the design of the phase detection pixels in the pixel array of the image sensor is improved, so that the image sensor can output the phase difference information in the at least two directions. In this way, a phase detection system of the image sensor may be applied to more to-be-photographed scenes, which resolves a problem regarding focusing experience in a camera system for a user, thereby improving focusing experience.

It should be noted that the apparatus for focusing provided in this embodiment of this application is an apparatus that can perform the above method for focusing, and all embodiments of the above method for focusing are applicable to the apparatus and the apparatus can achieve the same or similar beneficial effects.

The apparatus for focusing in this embodiment of this application may be an apparatus, or may be a component, an integrated circuit, or a chip in a terminal. The apparatus may be a mobile electronic device or a non-mobile electronic device. For example, the mobile electronic device may be a mobile phone, a tablet computer, a notebook computer, a palm computer, an on-board electronic device, a wearable device, an ultra-mobile personal computer (UMPC), a netbook, or a personal digital assistant (PDA); and the non-mobile electronic device may be a server, a network attached storage (NAS), a personal computer (PC), a television (TV), a teller machine, or an automated machine. This is not specifically limited in this embodiment of this application.

The apparatus for focusing in this embodiment of this application may be an apparatus having an operating system. The operating system may be Android, IOS, or another possible operating system, which is not specifically defined in this embodiment of this application.

The apparatus for focusing provided in this embodiment of this application can realize all processes realized in the method embodiment of FIG. 1 to FIG. 3. In order to avoid repetition, details are not described herein.

Figure 5:
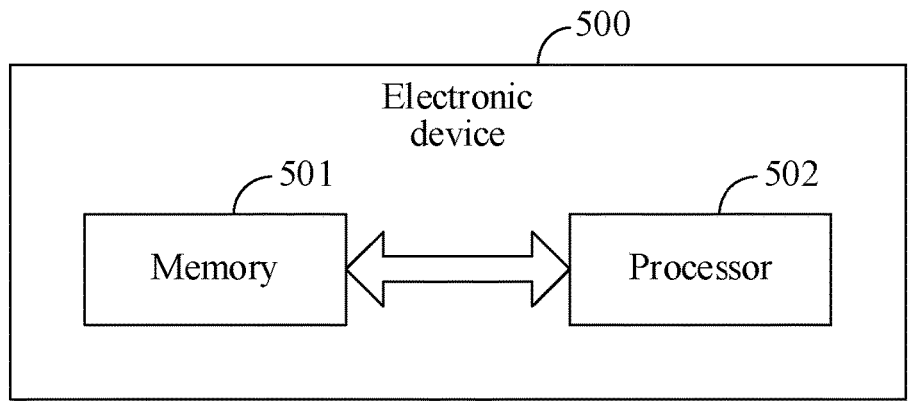
FIG. 5 is a first schematic structural diagram of an electronic device according to an embodiment of this application.

Optionally, as shown in FIG. 5, an embodiment of this application further provides an electronic device 500, including a processor 502, a memory 501, a program or instructions stored in the memory 501 and executable on the processor 502. When the program or the instructions are executed by the processor 502, the processes of the embodiment of the above method for focusing are implemented, and the same technical effects can be achieved. In order to avoid repetition, details are not described herein.

It should be noted that the electronic device in this embodiment of this application includes both the mobile electronic device and the non-mobile electronic device described above.

Figure 6:
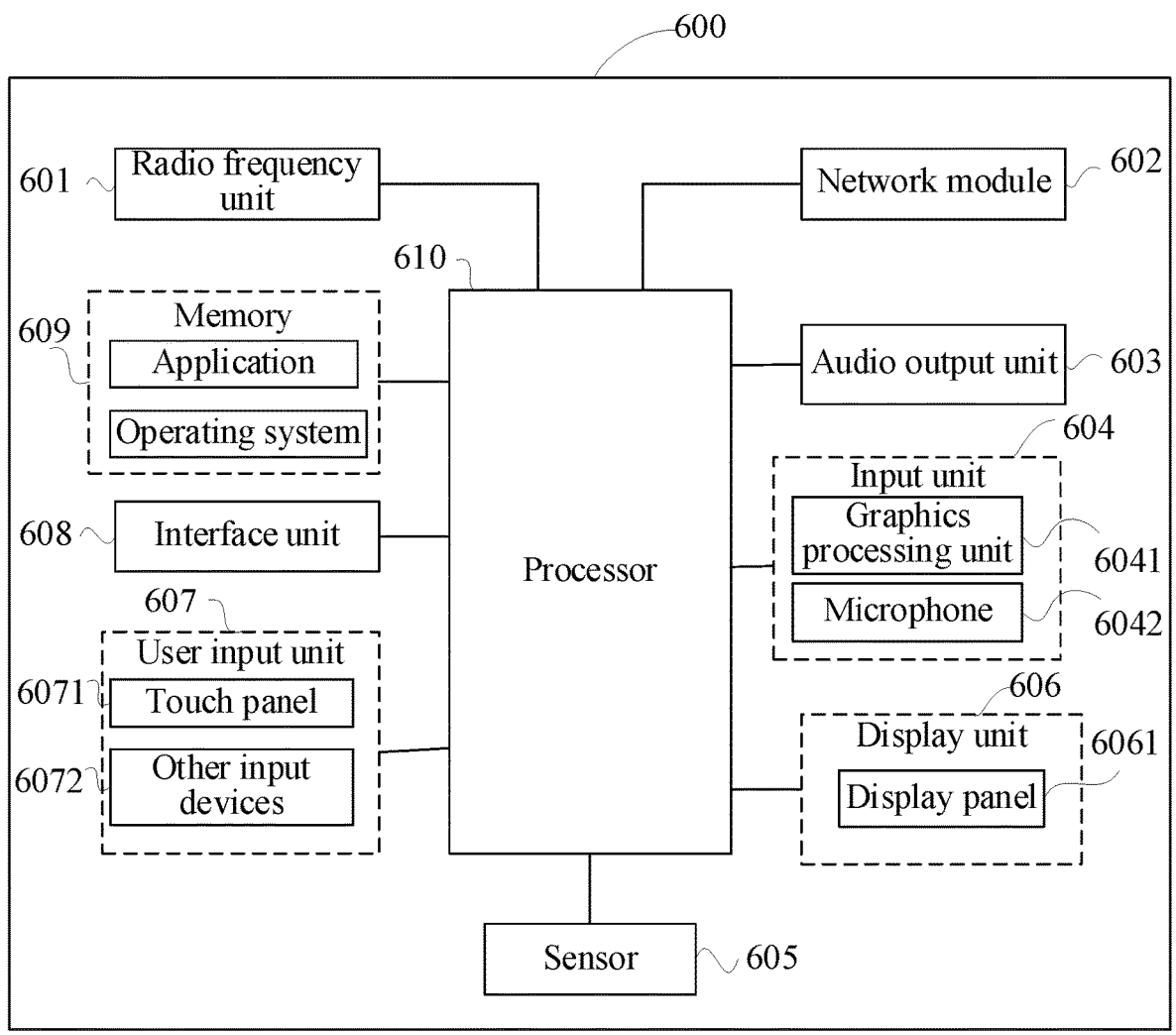
FIG. 6 is a second schematic structural diagram of an electronic device according to an embodiment of this application.

FIG. 6 is a schematic diagram of a hardware structure of an electronic device for implementing an embodiment of this application.

The electronic device 600 includes but is not limited to components such as a radio frequency unit 601, a network module 602, an audio output unit 603, an input unit 604, a sensor 605, a display unit 606, a user input unit 607, an interface unit 608, a memory 609, and a processor 610.

A person skilled in the art may understand that the electronic device 600 may further include a power supply (such as a battery) that supplies power to various components. The power supply may be logically connected to the processor 610 through a power management system, thereby realizing functions such as charging, discharging, and power consumption management through the power management system. The electronic device structure shown in FIG. 6 constitutes no limitation on the electronic device, and the electronic device may include more or fewer components than those shown in the figure, or a combination of some components, or different component layouts. Details are not described herein.

The processor 610 is configured to: obtain phase information detected respectively by at least four groups of phase detection pixels that an image sensor includes, where the at least four groups of phase detection pixels are arranged at different angles relative to a target pixel on the image sensor; determine phase difference information in at least two directions based on the phase information of the at least four groups of phase detection pixels; and focus, based on the phase difference information in the at least two directions, a camera module to which the image sensor belongs.

In the embodiments of this application, the design of the phase detection pixels in the pixel array of the image sensor is improved, so that the image sensor can output the phase difference information in the at least two directions. In this way, a phase detection system of the image sensor may be applied to more to-be-photographed scenes, which resolves a problem regarding focusing experience in a camera system for a user, thereby improving focusing experience.

It should be noted that the electronic device provided in this embodiment of this application is an electronic device that can perform the above method for focusing, and all embodiments of the above method for focusing are applicable to the electronic device and the electronic device can achieve the same or similar beneficial effects.

It should be noted that in this embodiment of this application, the input unit 604 may include a graphics processing unit (GPU) 6041 and a microphone 6042. The graphics processing unit 6041 processes image data of a static picture or a video obtained by an image capture apparatus (for example, a camera) in a video capture mode or an image capture mode. The display unit 606 may include a display panel 6061. The display panel 6061 may be configured in a form such as a liquid crystal display or an organic light-emitting diode. The user input unit 607 includes a touch panel 6071 and another input device 6072. The touch panel 6071 is also referred to as a touch screen. The touch panel 6071 may include two parts: a touch detection apparatus and a touch controller. The another input device 6072 may include but are not limited to a physical keyboard, a function key (such as a volume control key or a power on/off key), a trackball, a mouse, and a joystick. The memory 609 may be configured to store a software program and various data, including but not limited to applications and operating systems. An application processor and a modem processor may be integrated into the processor 610. The application processor mainly processes an operating system, a user interface, an application, and the like. The modem processor mainly processes wireless communication. It may be understood that the modem processor may alternatively not be integrated in the processor 610.

An embodiment of this application further provides a readable storage medium. The readable storage medium may be volatile or non-volatile. The readable storage medium stores a program or instructions. When the program or the instructions are executed by the processor, the processes of the embodiment of the above method for focusing are implemented, and the same technical effects can be achieved. In order to avoid repetition, details are not described herein.

The processor is a processor in the electronic device described in the above embodiment. The readable storage medium includes a computer-readable storage medium, such as a computer read-only memory (ROM), a random access memory (RAM), a magnetic disk, or an optical disk.

An embodiment of this application further provides a chip. The chip includes a processor and a communication interface. The communication interface is coupled to the processor. The processor is configured to execute a program or instructions to implement the processes of the embodiment of the above method for focusing, and can achieve the same technical effects. In order to avoid repetition, details are not described herein.

It should be understood that the chip in this embodiment of this application may also be referred to as a system level chip, a system chip, a chip system, a system on a chip, or the like.

It should be noted that terms "comprise", "include" or any other variants herein are intended to encompass non-exclusive inclusion, so that a process, a method, an article or an apparatus including a series of elements not only includes those elements, but also includes another element not listed explicitly or includes intrinsic elements for the process, the method, the article, or the apparatus. Without any further limitation, an element defined by the phrase "include one . . ." does not exclude existence of another same element in the process, the method, the article, or the apparatus that includes the elements. In addition, it should be noted that the scope of the method and the apparatus in the embodiments of this application is not limited to function execution in the order shown or discussed, and may further include function execution in a substantially simultaneous manner or in the opposite order based on the functions. For example, the described method may be performed in different order from the described order, and various steps may also be added, omitted, or combined. In addition, features described with reference to some examples may be combined in another example.

According to the above descriptions of the implementations, a person skilled in the art may clearly learn that the method in the above embodiments may be implemented by software and a necessary universal hardware platform, or may be implemented by hardware. However, in most cases, software and a general hardware platform are an example implementation. Based on this understanding, the technical solution of this application, in essence, or a part contributing to the related art may be embodied in a form of a software product. The software product is stored in a storage medium (such as a ROM/RAM, a disk, or a compact disc), including instructions for causing a terminal (such as a mobile phone, a computer, a server, an air conditioner, or a network device) to perform the method in the embodiments of this application.

Although the embodiments of this application are described above with reference to the drawings, this application is not limited to the specific embodiments described above. The above specific embodiments are illustrative but not restrictive. With the enlightenment of this application, a person of ordinary skill in the art may make many forms without departing from the concept of this application and the protection scope of the claims. These forms fall within the protection of this application.

The above descriptions are merely the specific implementations of this application, and are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A method for focusing, comprising:
   obtaining phase information detected respectively by at least four groups of phase detection pixels that an image sensor comprises, wherein the at least four groups of phase detection pixels are arranged at different angles relative to a target pixel on the image sensor;
   determining phase difference information in at least two directions based on the phase information of the at least four groups of phase detection pixels; and
   focusing, based on the phase difference information in the at least two directions, a camera module to which the image sensor belongs;
   wherein the at least four groups of phase detection pixels comprise six groups of phase detection pixels, and angles between the six groups of phase detection pixels and the target pixel comprise:
   a first angle, wherein the first angle is in a range of 0° to +60°;
   a second angle, wherein the second angle is in a range of +60° to +120°;
   a third angle, wherein the third angle is in a range of +120° to +180°;
   a fourth angle, wherein the fourth angle is in a range of −60° to 0°;
   a fifth angle, wherein the fifth angle is in a range of −120° to −60°; and
   a sixth angle, wherein the sixth angle is in a range of −180° to −120°.

2. The method according to claim 1, wherein the determining phase difference information in at least two directions based on the phase information of the at least four groups of phase detection pixels comprises:
   determining phase difference information in a target direction based on the phase information of at least two groups of phase detection pixels.

3. The method according to claim 2, wherein the determining phase difference information in a target direction based on the phase information of at least two groups of phase detection pixels comprises:
   determining a first phase sum of the phase information of the phase detection pixel at the third angle and the phase information of the phase detection pixel at the sixth angle;
   determining a second phase sum of the phase information of the phase detection pixel at the first angle and the phase information of the phase detection pixel at the fourth angle; and
   determining phase difference information in a horizontal direction based on a phase difference between the first phase sum and the second phase sum.

4. The method according to claim 2, wherein the determining phase difference information in a target direction based on the phase information of at least two groups of phase detection pixels comprises:
   determining a third phase sum of the phase information of the phase detection pixel at the first angle, the phase information of the phase detection pixel at the second angle, and the phase information of the phase detection pixel at the third angle;
   determining a fourth phase sum of the phase information of the phase detection pixel at the fourth angle, the phase information of the phase detection pixel at the fifth angle, and the phase information of the phase detection pixel at the sixth angle; and
determining phase difference information in a vertical direction based on a phase difference between the third phase sum and the fourth phase sum.

5. The method according to claim 2, wherein the determining phase difference information in a target direction based on the phase information of at least two groups of phase detection pixels comprises:
determining phase difference information in a +45° direction based on a phase difference between the phase information of the phase detection pixel at the first angle and the phase information of the phase detection pixel at the sixth angle.

6. The method according to claim 2, wherein the determining phase difference information in a target direction based on the phase information of at least two groups of phase detection pixels comprises:
determining phase difference information in a −45° direction based on a phase difference between the phase information of the phase detection pixel at the third angle and the phase information of the phase detection pixel at the fourth angle.

7. The method according to claim 2, wherein the determining phase difference information in a target direction based on the phase information of at least two groups of phase detection pixels comprises:
determining a fifth phase sum of the phase information of the phase detection pixel at the first angle and the phase information of the phase detection pixel at the second angle;
determining a sixth phase sum of the phase information of the phase detection pixel at the fifth angle and the phase information of the phase detection pixel at the sixth angle; and
determining phase difference information in a +15° direction based on a phase difference between the fifth phase sum and the sixth phase sum.

8. The method according to claim 2, wherein the determining phase difference information in a target direction based on the phase information of at least two groups of phase detection pixels comprises:
determining a seventh phase sum of the phase information of the phase detection pixel at the second angle and the phase information of the phase detection pixel at the third angle;
determining an eighth phase sum of the phase information of the phase detection pixel at the fourth angle and the phase information of the phase detection pixel at the fifth angle; and
determining phase difference information in a −15° direction based on a phase difference between the seventh phase sum and the eighth phase sum.

9. A chip for performing the method according to claim 1, comprising a processor and a communication interface, wherein the communication interface is coupled to the processor, and the processor is configured to execute a program or instructions to perform:
obtaining phase information detected respectively by at least four groups of phase detection pixels that an image sensor comprises, wherein the at least four groups of phase detection pixels are arranged at different angles relative to a target pixel on the image sensor;
determining phase difference information in at least two directions based on the phase information of the at least four groups of phase detection pixels; and
focusing, based on the phase difference information in the at least two directions, a camera module to which the image sensor belongs.

10. A computer program product for performing the method according to claim 1, stored in a readable storage medium, wherein the computer program product is executed by at least one processor to perform:
obtaining phase information detected respectively by at least four groups of phase detection pixels that an image sensor comprises, wherein the at least four groups of phase detection pixels are arranged at different angles relative to a target pixel on the image sensor;
determining phase difference information in at least two directions based on the phase information of the at least four groups of phase detection pixels; and
focusing, based on the phase difference information in the at least two directions, a camera module to which the image sensor belongs.

11. An electronic device, comprising a processor, a memory, and a program or instructions stored in the memory and executable on the processor, wherein the program or the instructions are executed by the processor to perform:
obtaining phase information detected respectively by at least four groups of phase detection pixels that an image sensor comprises, wherein the at least four groups of phase detection pixels are arranged at different angles relative to a target pixel on the image sensor;
determining phase difference information in at least two directions based on the phase information of the at least four groups of phase detection pixels; and
focusing, based on the phase difference information in the at least two directions, a camera module to which the image sensor-belongs belongs;
wherein the at least four groups of phase detection pixels comprise six groups of phase detection pixels, and angles between the six groups of phase detection pixels and the target pixel comprise:
a first angle, wherein the first angle is in a range of 0° to +60°;
a second angle, wherein the second angle is in a range of +60° to +120°;
a third angle, wherein the third angle is in a range of +120° to +180°;
a fourth angle, wherein the fourth angle is in a range of −60° to 0°;
a fifth angle, wherein the fifth angle is in a range of −120° to −60°; and
a sixth angle, wherein the sixth angle is in a range of −180° to −120°.

12. The electronic device according to claim 11, wherein when determining phase difference information in at least two directions based on the phase information of the at least four groups of phase detection pixels, the program or instruction is executed by the processor to perform:
determining phase difference information in a target direction based on the phase information of at least two groups of phase detection pixels.

13. The electronic device according to claim 12, wherein when determining phase difference information in a target direction based on the phase information of at least two groups of phase detection pixels, the program or instruction is executed by the processor to perform:
determining a first phase sum of the phase information of the phase detection pixel at the third angle and the phase information of the phase detection pixel at the sixth angle;

determining a second phase sum of the phase information of the phase detection pixel at the first angle and the phase information of the phase detection pixel at the fourth angle; and determining phase difference information in a horizontal direction based on a phase difference between the first phase sum and the second phase sum.

14. The electronic device according to claim 12, wherein when determining phase difference information in a target direction based on the phase information of at least two groups of phase detection pixels, the program or instruction is executed by the processor to perform:

determining a third phase sum of the phase information of the phase detection pixel at the first angle, the phase information of the phase detection pixel at the second angle, and the phase information of the phase detection pixel at the third angle;

determining a fourth phase sum of the phase information of the phase detection pixel at the fourth angle, the phase information of the phase detection pixel at the fifth angle, and the phase information of the phase detection pixel at the sixth angle; and determining phase difference information in a vertical direction based on a phase difference between the third phase sum and the fourth phase sum.

15. The electronic device according to claim 12, wherein when determining phase difference information in a target direction based on the phase information of at least two groups of phase detection pixels, the program or instruction is executed by the processor to perform:

determining phase difference information in a +45° direction based on a phase difference between the phase information of the phase detection pixel at the first angle and the phase information of the phase detection pixel at the sixth angle;

or, determining phase difference information in a −45° direction based on a phase difference between the phase information of the phase detection pixel at the third angle and the phase information of the phase detection pixel at the fourth angle.

16. The electronic device according to claim 12, wherein when determining phase difference information in a target direction based on the phase information of at least two groups of phase detection pixels, the program or instruction is executed by the processor to perform:

determining a fifth phase sum of the phase information of the phase detection pixel at the first angle and the phase information of the phase detection pixel at the second angle;

determining a sixth phase sum of the phase information of the phase detection pixel at the fifth angle and the phase information of the phase detection pixel at the sixth angle; and determining phase difference information in a +15° direction based on a phase difference between the fifth phase sum and the sixth phase sum.

17. The electronic device according to claim 12, wherein when determining phase difference information in a target direction based on the phase information of at least two groups of phase detection pixels, the program or instruction is executed by the processor to perform:

determining a seventh phase sum of the phase information of the phase detection pixel at the second angle and the phase information of the phase detection pixel at the third angle;

determining an eighth phase sum of the phase information of the phase detection pixel at the fourth angle and the phase information of the phase detection pixel at the fifth angle; and determining phase difference information in a −15° direction based on a phase difference between the seventh phase sum and the eighth phase sum.

18. A readable storage medium, storing programs or instructions, wherein the program or the instructions are executed by a processor to perform:

obtaining phase information detected respectively by at least four groups of phase detection pixels that an image sensor comprises, wherein the at least four groups of phase detection pixels are arranged at different angles relative to a target pixel on the image sensor;

determining phase difference information in at least two directions based on the phase information of the at least four groups of phase detection pixels; and focusing, based on the phase difference information in the at least two directions, a camera module to which the image sensor belongs;

wherein the at least four groups of phase detection pixels comprise six groups of phase detection pixels, and angles between the six groups of phase detection pixels and the target pixel comprise:

a first angle, wherein the first angle is in a range of 0° to +60°;

a second angle, wherein the second angle is in a range of +60° to +120°;

a third angle, wherein the third angle is in a range of +120° to +180°;

a fourth angle, wherein the fourth angle is in a range of −60° to 0°;

a fifth angle, wherein the fifth angle is in a range of −120° to −60°; and a sixth angle, wherein the sixth angle is in a range of −180° to −120°.

* * * * *